United States Patent
Crawford et al.

(10) Patent No.: US 10,510,099 B2
(45) Date of Patent: Dec. 17, 2019

(54) METHOD AND APPARATUS FOR PROVIDING CONTENT IN A COMMUNICATION SYSTEM

(71) Applicant: AT&T Mobility II LLC, Atlanta, GA (US)

(72) Inventors: Jerry Crawford, Dallas, TX (US); Quyen Quach, Redmond, WA (US)

(73) Assignee: AT&T Mobility II LLC, Atlanta, GA (US)

(*) Notice: Subject to any disclaimer, the term of this patent is extended or adjusted under 35 U.S.C. 154(b) by 851 days.

(21) Appl. No.: 14/481,972

(22) Filed: Sep. 10, 2014

(65) Prior Publication Data
US 2016/0071157 A1    Mar. 10, 2016

(51) Int. Cl.
*G06Q 30/00* (2012.01)
*G06F 17/30* (2006.01)
*G06Q 30/02* (2012.01)

(52) U.S. Cl.
CPC ..... *G06Q 30/0269* (2013.01); *G06Q 30/0226* (2013.01); *G06Q 30/0257* (2013.01); *G06Q 30/0261* (2013.01)

(58) Field of Classification Search
CPC .................................. G06Q 30/0207–30/0277
USPC .......................................................... 705/14
See application file for complete search history.

(56) References Cited

U.S. PATENT DOCUMENTS

| | | | |
|---|---|---|---|
| 7,613,692 B2 | 11/2009 | Hamilton et al. | |
| 8,442,500 B2 | 5/2013 | Gupta et al. | |
| 8,549,061 B2 | 10/2013 | Rao et al. | |
| 2003/0035409 A1* | 2/2003 | Wang | H04L 29/06 370/349 |
| 2003/0130595 A1* | 7/2003 | Mault | G06F 19/3418 600/567 |
| 2006/0123010 A1* | 6/2006 | Landry | G06F 17/30557 |
| 2006/0184538 A1 | 8/2006 | Randall et al. | |
| 2007/0073799 A1 | 3/2007 | Adjali et al. | |
| 2009/0076885 A1* | 3/2009 | Fein | G06Q 30/0203 705/7.32 |
| 2010/0250341 A1* | 9/2010 | Hauser | G06F 17/30867 707/769 |
| 2010/0305855 A1 | 12/2010 | Dutton et al. | |

(Continued)

FOREIGN PATENT DOCUMENTS

KR    20130045642    5/2013

OTHER PUBLICATIONS

Cano, Elizabeth et al., "Sensing presence (presense) ontology: User modelling in the semantic sensor web", The Semantic Web: ESWC 2011 Workshops. Springer Berlin Heidelberg, 2012.

*Primary Examiner* — Yehdega Retta
(74) *Attorney, Agent, or Firm* — Guntin & Gust, PLC; Ralph Trementozzi

(57) ABSTRACT

Aspects of the subject disclosure may include, for example, a device including a memory and a processor for performing operations including accessing a user persona comprising a plurality of attributes and a plurality of content preferences of a user of a communication device, presenting at an interactive site a plurality of content suggestions that are generated according to the user persona, receiving a content selection from a presentation of the plurality of content suggestions at the interactive site, and updating the plurality of content preferences of the user persona according to the content selection. Other embodiments are disclosed.

20 Claims, 13 Drawing Sheets

(56) References Cited

U.S. PATENT DOCUMENTS

| | | |
|---|---|---|
| 2011/0125777 A1 | 5/2011 | Begeja et al. |
| 2011/0125783 A1 | 5/2011 | Whale et al. |
| 2011/0264528 A1* | 10/2011 | Whale .................... G06Q 30/02 705/14.58 |
| 2013/0144710 A1 | 6/2013 | Roundtree et al. |
| 2013/0318180 A1* | 11/2013 | Amin .................... H04L 65/403 709/206 |
| 2014/0052008 A1 | 2/2014 | Kim et al. |
| 2014/0172567 A1 | 6/2014 | Manoogian et al. |
| 2014/0200463 A1* | 7/2014 | el Kaliouby ........ G06F 19/3418 600/484 |
| 2014/0236622 A1* | 8/2014 | Southam ................ G06Q 30/02 705/2 |
| 2016/0270717 A1* | 9/2016 | Luna .................. G06F 19/3481 |

* cited by examiner

100

Atlanta        Seattle

400

500

500

600

800

METHOD AND APPARATUS FOR PROVIDING CONTENT IN A COMMUNICATION SYSTEM

FIELD OF THE DISCLOSURE

The subject disclosure relates to a method and apparatus for providing content in a communication system.

BACKGROUND

Communication systems, such as a mobile communications system, can be used for providing various services, including voice, video and/or data services, and user location information can be important for next generation IP multi-media services provided by telecommunication systems. With the advent of multiple function communication system, opportunities are created for creating and growing customer relationships to service providers. Consumers increasingly expect services that are not only efficient and capable but that fulfill their individual desires.

BRIEF DESCRIPTION OF THE DRAWINGS

Reference will now be made to the accompanying drawings, which are not necessarily drawn to scale, and wherein.

DETAILED DESCRIPTION

Figure 1:
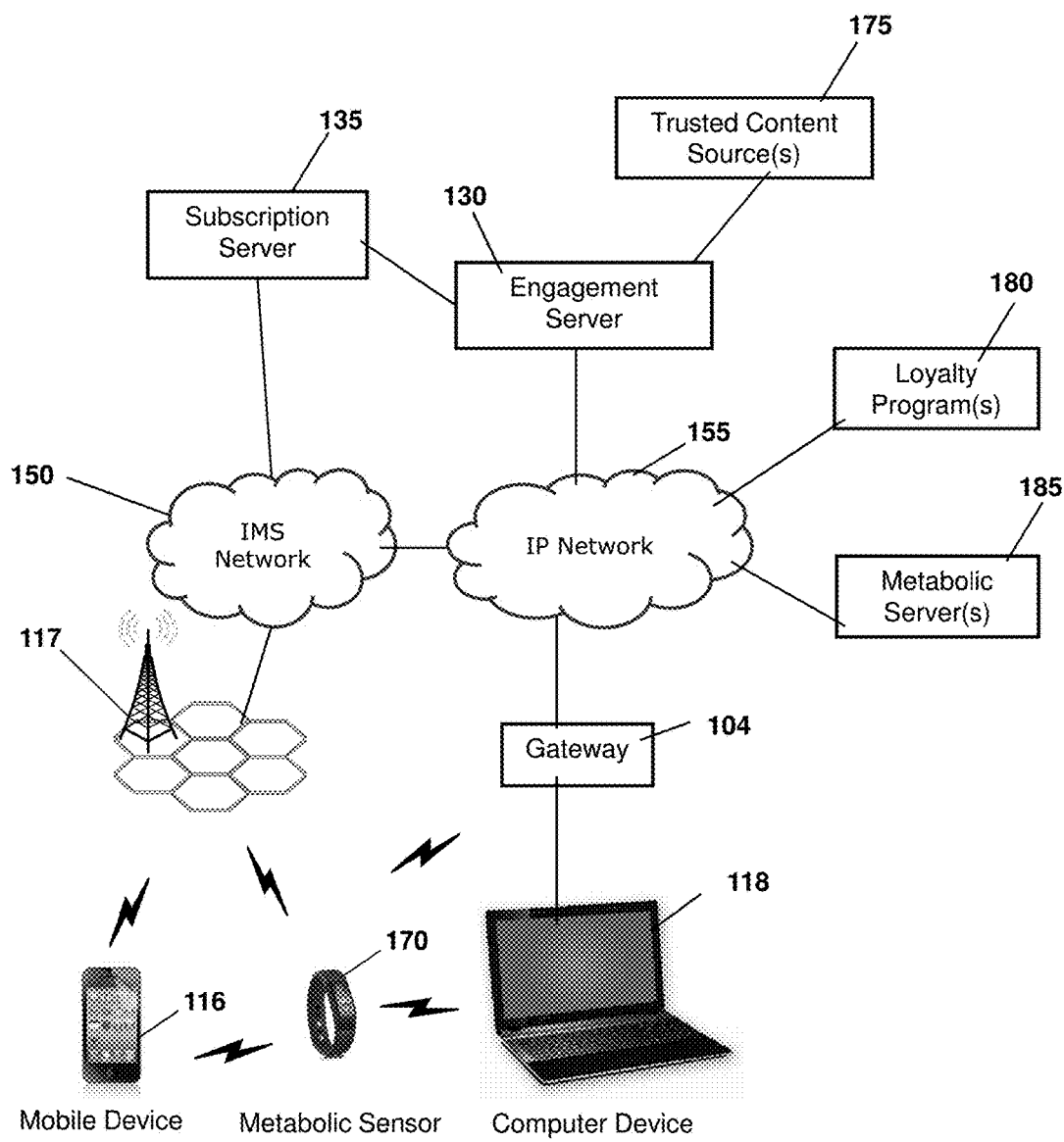
FIG. 1 depicts illustrative embodiments of a system for providing services for mobile devices in a communication network.

The subject disclosure describes, among other things, illustrative embodiments for a method and system for providing relevant content, goods, and/or services to users of mobile devices. The exemplary embodiments can include a method and system for presenting an interactive site accessible to users of mobile devices. A server can access usage context information for a user of a mobile device, including subscription information, network information, and location information. The server can also access metabolic information associated with the user of mobile device. The server can further access a user persona associated with the user of the mobile device. The server can use the usage context information, the metabolic information, and/or the user persona to generated a set of relevant content suggestions. Users can select content, services, and/or goods from the set of suggestions, and the selections can be fulfilled. The service can collect feedback of reactions/comments of the users to the content, services, and/or content that is selected and received. This fed back information can further be used to fine-tune suggestions that are generated and presented to the users. A self-description utility can allow the user of the mobile device to provide self-describing information via the interactive site. The self-describing utility can also be updated as the user interacts with the interactive site and the set of relevant content selections. The self-describing information can inform the user persona with additional data for improving subsequent sets of relevant content suggestions.

One embodiment of the subject disclosure includes a computer-readable storage device, comprising executable instructions. The executable instructions can cause a processor to perform operations comprising generating a user persona comprising a plurality of attributes and a plurality of content preferences of a user of the communication device. The processor can further perform operations comprising accessing, at the communication network, metabolic information that is collected from the user of the communication device, and, in turn, generating user status information based on the metabolic information. The processor can perform operations comprising accessing, via the communication network, usage context information associated with the communication device. The processor can also perform operations comprising generating a plurality of content suggestions relevant to the user of the communication device according to the user persona, the user status information, and the usage context information. The processor can also perform operations comprising presenting an interactive site to the communication device. The interactive site can include the plurality of content suggestions. The processor can further perform operations comprising receiving a content selection from the plurality of content suggestions at the interactive site and, in turn, providing the content selection for reproduction at the communication device. The processor can perform operations comprising receiving a first content preference associated with the reproduction of the content selection at the communication device and, in turn, updating the plurality of content preferences of the user persona according to the first content preference that is received.

One embodiment of the subject disclosure includes a method including initiating, by a system comprising a processor, accessing metabolic information associated with the user of a communication device and accessing usage context information associated with the communication device. The method can also include accessing user persona information comprising a plurality of attributes associated with the user of the communication device. The method can further include generating content suggestions relevant to the user of the communication device according to the metabolic information, the usage context information, and the user persona information and, in turn, presenting the updated content suggestions at an interactive site.

One embodiment of the subject disclosure includes a communication device comprising a memory to store executable instructions and a processor. The executable instructions, responsive to being executed by the processor, can facilitate the performance of operations including accessing a user persona comprising a plurality of attributes and a plurality of content preferences of a user of a communication device. The operations can also include presenting at an interactive site a plurality of content suggestions that are generated according to the user persona. The operations can include receiving a content selection from a presentation of the plurality of content suggestions at the interactive site and, updating the plurality of content preferences of the user persona according to the content selection.

In FIG. 1, a mobile communication system 100 is illustrated that can provide wireless communication services, including voice, video and/or data services to mobile communications devices 116 and other computer devices 118. System 100 can enable wireless communication services over a number of different networks, such as between mobile communication devices 116 and computer devices 118. Mobile communication devices 116 can include a number of different types of devices that are capable of voice, video and/or data communications, including cellular phones, smartphones, personal computers, media processing devices, and so forth.

In one or more embodiments, the communication system 100 can provide access to an Internet Protocol (IP) Multimedia Subsystem (IMS) network 150 to facilitated combined services of circuit-switched and packet-switched systems. The IMS network 150 can be accessed, for example, via one or more cellular base stations 117. For example, a mobile communication device 116 can connect to a cellular base station 117 via a wireless communication signal. The mobile communication device 116 can communication, via the IMS network 150, with other mobile communication devices, with landline communication devices, and with an Internet Protocol (IP) network 155, such as the Internet or the world-wide web (WWW). The communication system 100 can provide communications and sharing of various resources between mobile communication devices 116 and various devices, such as computer devices 118, which are connected to the IP network 155.

In one or more embodiments, the communication system 100 can include an engagement server 130. An engagement server 130 can coordinate interactions with users/subscribers to a service provider to promote customer engagement, enthusiasm, and retention. In one or more embodiments, the engagement server 130 can manage an interactive site that is accessible via the IP Network 155. The engagement server 130 can provide interactions, especially interactions with content, services, and goods, which are relevant to users of mobile communication devices 116. In one embodiment, the engagement server 130 can be associated with a service provider that operates aspects of a telecommunication system within the communication system 100. For example, provider of telecommunication services for mobile communication devices 116 operating over the IMS Network 150 can utilize the engagement server to provide relevant content, goods, and services for subscribers to the services of the IMS Network 150. The engagement server 130 can utilize uniquely accessible information from mobile communication devices 116 of subscribers to the IMS Network 150 to provide content, goods, and services that are especially relevant and useful to the subscribers. In turn, the engagement server 130 can establish and build business and brand relationships with these subscribers that extend beyond the typical boundaries of providing telecommunication services.

In one or more embodiments, the engagement server 130 can capture, access, and/or utilize various types of information associated with the subscribers of the mobile communication devices 116. In one embodiment, the engagement server 130 can access information at a subscription server 135. The subscription server 135 can, for example, be all or part of a home subscription server (HSS) that manages registration and authentication services. The engagement server 130 can be incorporated into the subscription server 135 and/or an HSS. The HSS can provide the engagement server 130 functional services. The engagement server 130 can access information unique to the mobile communication device 116 to identify the user of the device 116, to determine if the user is a subscriber to the IMS network 150, and/or to authenticate the user to the additional services that are managed and provided by the engagement server 130. In one or more embodiments, the engagement server 130 can access subscription information that was collected as part of the subscription process. For example, the engagement server 130 can access information via the subscription server 135 regarding identity information (name, address, subscription account), demographic information (age, sex, marital status, educational status), current connectivity information in the IMS network (location, cellular base station connectivity, network capabilities, day, date, and/or time), and/or subscription services that have been purchased (voice/data plans, data limits, household limits, special services).

In one or more embodiments, the engagement server 130 can further capture, access, and/or utilize information regarding metabolic and/or biometric data that is sensed at the subscriber. In one embodiment, the engagement server 130 can access information from one or more metabolic servers 185 that receive and store data that has been sensed at the subscriber. In one or more embodiments, a mobile communication device 116 can include one or more metabolic sensors that can measure one or more aspects of a physical and/or mental state of a person, who is holding, carrying, operating, and/or in proximity to the mobile communication device 116. In various examples, discrete metabolic sensors 170 can be worn or carried or otherwise placed in proximity to the subscriber. For example, one or more metabolic sensors 170 can be incorporated into a wearable wristband, a bracelet, and/or an article of clothing. Metabolic sensors 170 can be incorporated into furniture, vehicles, rooms, personal items, and/or other computer devices 118 that will come into contact with and/or be in proximity to the user/subscriber of the mobile communication device 116.

In one or more embodiments, the metabolic sensors 170 can measure and/or indicate information associated with, but not limited to, bodily functions, operations, performance, mental conditions, emotions, movements, and/or conditions of the user/subscriber. For example, the metabolic sensors 170 can measure and/or indicate information regarding temperature (of the person and/or of the environment), heart rate, blood pressure, galvanic skin response, respiration, brain waves, eye movements, perspiration, grip pressure, and/or shake. In one or more embodiments, the information collected at the metabolic sensors 170 can be reported to a metabolic server 185 directly, as raw measurements/indicators, or indirectly, as statistically processed information. In one embodiment, metabolic sensors 170 that are incorporated into a mobile communication device 116 can report information via the IMS Network 150, which can further be routed to one or more metabolic servers 185 that can be connected to the IP network 155 or that can be connected to the IMS network 150. In one embodiment, discrete metabolic sensors 170, such as wrist band for monitoring heart rate, can be coupled to a mobile communication device 116 via a wire or via a local wireless connection, such as Bluetooth™. Metabolic information can be captured at the discrete metabolic sensor 170 and transmitted to the mobile communication device 116 for forwarding to the metabolic server 185. In one embodiment, the discrete metabolic sensor 170 can include its own cellular wireless communication link to the IMS network 117. For example, a discrete metabolic sensor 170 that is incorporated into a vehicle and/or a facility that includes a cellular link capability can report metabolic data using that cellular link. In another embodiment, the discrete metabolic sensor 170 can form a local communication link, such as a Bluetooth™ link and/or a WiFi link to another computer device 118 and/or to a local gateway device 104.

In one or more embodiments, the metabolic sensor measurements and/or indications can be processed to make determinations regarding physical and/or mental states of the user/subscriber. For example, metabolic sensor information showing an elevated heart rate or increased blood pressure can be interpreted as indicative of user stress. Temperature and perspiration information can be used determine that user is overheated. Respiration information can indicate that the user is working out. In the one embodiment, information from multiple metabolic sensors 170 can be combined to form determinations regarding the physical and/or mental state of the user/subscriber. In one embodiment, metabolic sensor information can be combined with other types of information available to the mobile communication device 116 and/or the IMS network 150 to form determinations about physical and/or mental state. For example, a location of the user/subscriber can be determined at the mobile communication device 116 using satellite-based, global positioning system (GPS). This location data can indicate, for example, that the mobile communication device 116 is in the vicinity of a local walking/biking path. This location data can be combined with metabolic sensor data indicating an elevated heart rate and perspiration to make a conclusion that the user/subscriber for the mobile communication device 116 is probably walking or bicycling on the path. Further analysis of telemetry data from the GPS could indicate a speed of moment consistent with walking, running, or bicycling to further refine probable activity.

In one or more embodiments, the engagement server 130 can access information from one or more metabolic servers 185. Metabolic servers 185 can collect raw information, such as heart rate and temperature, from mobile communication devices 116 and metabolic sensors 170 associated with users/subscribers. Metabolic servers 185 can also collect mental and/or physical state determinations or inferences made based on metabolic information. These determinations can be made at the mobile communication device 116 and/or at the metabolic server 185. The collected metabolic sensor information and/or determination information regarding physical and/or mental state can be made available to the engagement server 130 for use in generating suggestions for content, goods, and/or services at the interactive site.

In one or more embodiments, the engagement server 130 can access information regarding customer loyalty programs from one or more loyalty program databases 180. Customer loyalty programs can include programs that provide discounts, rebates, or other incentives for purchasing goods and/or services based on repeat business. Loyalty programs can be used to build relationships and enthusiasm for products and/or brands by rewarding consumers for repeated participation through purchasing, recommending, and/or promoting the products and/or brand. The engagement server 130 can use customer loyalty information from one or more loyalty program databases to determine whether a user/subscriber associated with a mobile communication device 116 is listed in the database and, if so, to determine what incentives/rewards/promotions may apply to this user/subscriber. In one embodiment, the engagement server 130 can use this loyalty information in generating suggestions for content/goods/services specific to this person. For example, the engagement server 130 can determine, based on a combination of subscription information, IMS network information, and metabolic information, that a set of suggested content/goods/services should include a recommendation for a restaurant for dinner. The engagement server 130 can determine, from a loyalty program database 180, that the user of the mobile communication device 116 is a member of a dining rewards plan at a national restaurant chain that has a franchise near the present location of the mobile communication device 116. The engagement server 130 can, therefore, include an offer for discounted dining at this restaurant as part of the content/goods/services suggests at the interactive site.

In one or more embodiments, the engagement server 130 can access one or more trusted content sources 175 for information regarding available content and/or to retrieve content that is selected by the user/subscriber from the interactive site. A trusted content source 175 can be a source associated with the service provider and/or an operator of the engagement server 130. The engagement server 130 can have several trusted content sources 175 that can provide quality content, applications, goods, and/or services for users/subscribers. In one embodiment, the engagement server 130 can monitor the trusted content sources 175 for factors, such as, quality of service, pricing, availability of popular and/or unique content, absence of malicious content and/or advertising, and the like, to insure that the engagement server 130 can provide high quality, reliable, and trouble-free content to customers.

Figure 2:
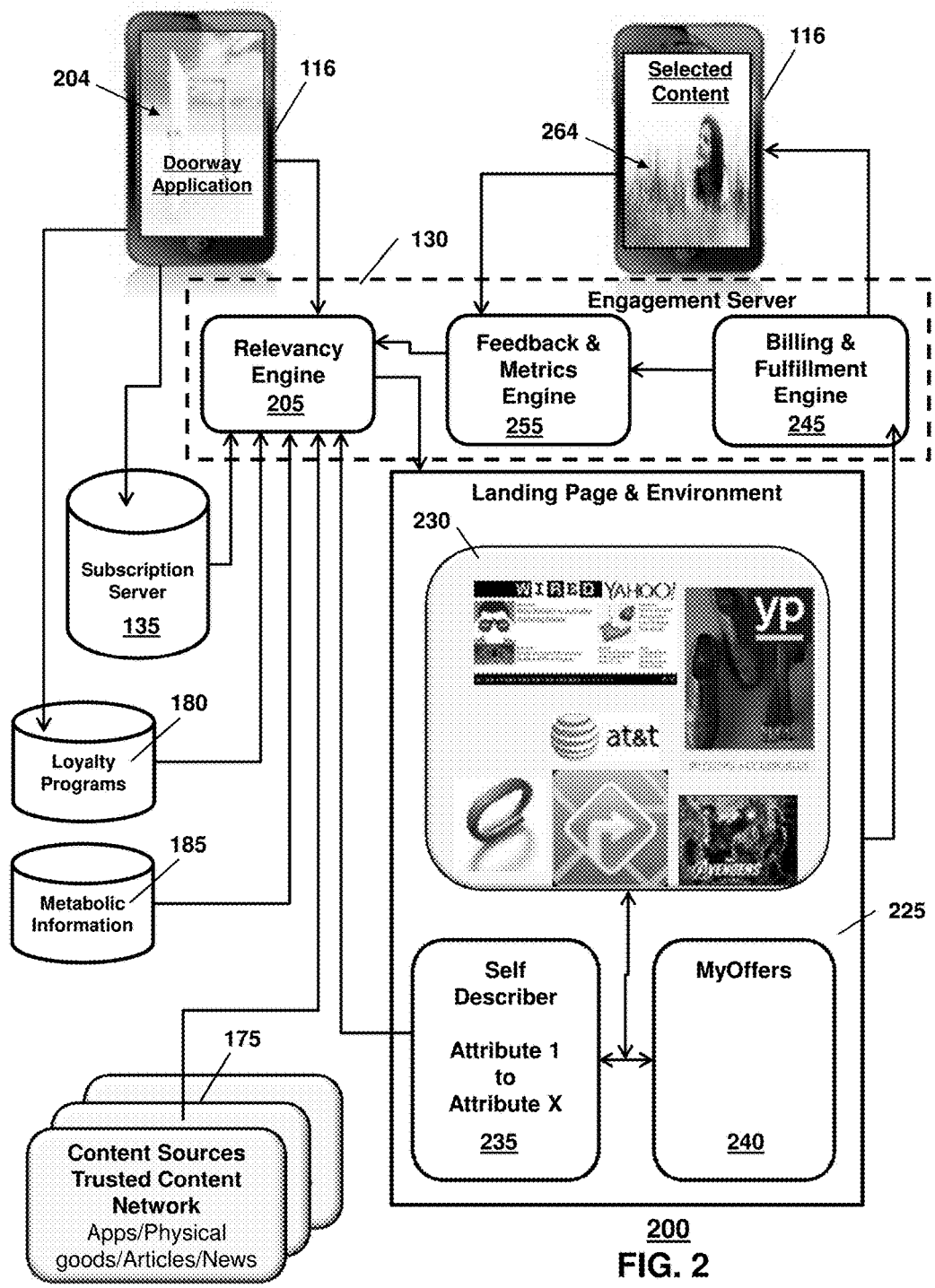
FIG. 2 depicts illustrative embodiments of a system for providing relevant content and services to a user of a mobile device in a communication network.

In FIG. 2, a consumer engagement system 200, which can provide relevant content, goods, and services to users of mobile communication devices 116, is illustrated. The consumer engagement system 200 can include an engagement server 130, subscription server 135, loyalty program database 180, metabolic information server 185, and one or more trusted content sources 175. The engagement server 130 can further include a relevancy engine 205, a feedback and metrics engine 225, and a billing and fulfillment engine 245. The consumer engagement engine 200 can provide a means for allowing user of a mobile device 116 to enter into an interactive site 225, which can provide links to suggested content, applications, goods, and/or services that are relevant to the user. For example, the interactive site can provide a window 230 that presents links, in graphical format, for accessing relevant content, applications, goods, and/or services.

In one or more embodiments, a user can enter the consumer engagement system 200 either directly or via a doorway application 204. For example, the interactive site 225 can be part of a site that can be used for monitoring and/or managing telecommunication services for the mobile communication device 116. The user can enter the interactive site 225 via an application icon selected at the mobile communication device 116. The interactive site 225 can include services for monitoring usage of telecommunication services (minutes, data) and/or modifying services. The interactive site 225 can require user authentication for access to information regarding subscription services. In another example, the user can access the interactive site 225 from a doorway application. The doorway application 204 can be any application or website that has been selected or navigated to using the mobile communication device 116. In one embodiment, the doorway application 204 can include a link that, if selected, directs the mobile communication device 116 to the interactive site 225.

In one or more embodiments, when the mobile communication device 116 initiates the interact site, by selecting the site application or by selecting a link at a doorway application, the relevancy engine 205 of the engagement server 130 can generate a set of suggest content, applications, goods, and/or services for presentation at a window 230 of the interactive site 225. The relevancy engine 205 can access, from the subscription server 135, subscription information associated with the mobile communication device 116. From this subscription information, the relevancy engine 205 can determine an identity of the user plus additional location and demographic information, as stored with the subscription information. In one or more other embodiments, the relevancy engine 205 can directly access substantial additional information regarding the mobile communication device 116 and its user/subscriber. For example, the relevancy engine 205 can access information directly from the mobile communication device 116. The mobile communication device 116 can report its location as derived, for example, from GPS. The mobile communication device 116 can report information about its network connection, such as strength of signal and local cellular base station. The mobile communication device 116 can report its capabilities, including information regarding its memory capacity, display capability, firmware version, user configuration, loaded applications, and/or loaded content. In one or more embodiments, the relevancy engine can use information regarding the location, network connectivity, and capabilities of the mobile communication device 116 to determine selections for content, applications, goods, and/or services. For example, the relevancy engine can filter potential content and/or application selections based on the reported capabilities of the mobile communication device 116 such that selections do not exceed these capabilities. If, for example, the mobile communication device 116 lacks sufficient display or memory capability to reproduce and/or execute certain content and/or applications, then the relevancy engine 205 will eliminate those content and/or applications from the pool of selections that could be presented to the user. Similarly, the relevancy engine 205 can eliminate potential choices of content and/or applications where the network connectivity is known to be of marginal or low strength or where the network path is known to not be capable of supporting the bandwidth necessary for a good user experience. By filtering out potential choices of content and/or applications, before these are offered as selection options, the relevancy engine 205 can improve the user experience and satisfaction by not tempting the user into selecting items that will prove to be frustrating during reproduction and/or execution. In this way, the relevancy engine 205 can proactively improve the user's perception not only for the interactive site 230 but also for the telecommunication services in general.

In one or more embodiments, the relevancy engine 205 can access information from the metabolic server 185. The metabolic information can be raw measurement and/or indicator data from metabolic sensors at the mobile communication device 116 and/or other metabolic sensors at or in the proximity of the mobile communication device 116. The metabolic information can be summarized information, such as presumed physical and/or mental states of the user of the mobile communication device 116 that are based on metabolic data. For example, the relevancy engine 205 can access information describing the present temperature in environment of the user, the user's present heart rate, and a determined mental state of "under stress." In one or more embodiments, the relevancy engine 205 can use the metabolic information to tailor offerings of content, applications, goods, and/or services that can be presented at a window 230 of the interactive site 225. For example, the relevancy engine can use one or more metabolic information items to determine an offering of a video content item that teaches beginner yoga for relaxation or a service offering of a local pub.

In one or more embodiments, the relevancy engine 205 can access information from one or more loyalty program databases 180. The loyalty information can allow the relevancy engine to determine which program memberships, if any, for the user of the mobile communication device 116. The loyalty information can be from one or more third parties, including vendors of goods and/or services and/or marketers for such goods and/or services. The relevancy engine 205 can use the loyalty information to tailor offerings of content, applications, goods and/or services so that the user sees offerings that are part of his/her loyalty programs. The relevancy engine 205 can specifically target offerings that will help the user to attain program goals or achieve program reward targets. For example, if the user has is a member of a loyalty program that issues rewards based on consumption and/or purchases of certain types of items, then the relevancy engine can present offers for those items at a My Offers window 240 of the interactive site 225. The relevancy engine 205 can track user progress toward reward goals. In one or more embodiments, the relevancy engine 204 can present offers for new loyalty programs as directed, for example, by a sponsorship arrangement. These new loyalty program offers can be tailored to the demographics and/or usage history of the user of the mobile communication device 116.

In one or more embodiments, the relevancy engine 205 can provide a self-description function which can be presented at a self-description window 235 at the interactive site 225. The self-description function can allow the user to choose attributes that they feel describe their personality, lifestyle, hobbies, and/or tastes in content, applications, goods, and/or services. For example, the self-description window 235 can ask the user to choose between various descriptive attributes 1 through X that best describe something about themselves. In one or more embodiments, the relevancy engine can track user self-description information to generate a user persona for the user/subscriber associated with the mobile communication device 116. This user persona can be maintained and continually built upon during each subsequent visit to the interactive site. Over time, the relevancy engine 205 can develop a detailed user persona profile that describes many personality, lifestyle, and/or preference attributes that describe this user.

In one or more embodiments, the relevancy engine 205 can also track selections that are made by the user of the mobile communication device 116. With each selection, the relevancy engine adds to a selection history for the user. In one embodiment, a user selection history can be incorporated into the user persona profile. For example, a user persona can include a hundred descriptive attributes, which the user has self-described at the interactive site 225 over a several months of interactions. The user persona can further include a few dozen items of content, applications, goods, and/or services that the user has selected from the offerings at the interactive site 225. In one embodiment, the relevancy engine can correlate the self-description attributes of the user with attributes of the content, applications, goods, and/or services selected by the user from the items offered at the interactive site 225.

In one or more embodiments, as the user persona profile develops, the relevancy engine 205 can further tailor offerings presented to the user of the mobile communication device 116 according to the user persona. For example, the relevancy engine 205 can determine a preliminary set of offerings of content, applications, goods, and/or services based on one or more of subscription information, loyalty program information, and metabolic information. The relevancy engine 205 can further filter this preliminary set of offerings based on the current user persona. If the user persona includes an extensive set of self-described attributes that have been correlated to attributes of past selections, then the relevancy engine 205 can use this rich database to winnow down the preliminary set of offerings to a final set of offerings that should be most relevant to the user.

In one or more embodiments, the engagements server 130 can include a billing and fulfillment engine 245. When an offering is selected from the interactive site 225, the billing and fulfillment engine 245 can acquire the selected item of content, application, good, and/or service. For example, if the user selects a media content item, then the billing and fulfillment engine 245 can contact a server of a trusted content source 175 to request that this item be made available to the mobile communication device 116. The trusted content source 175 can then provide the content via data streaming and/or file transfer according to the subscription agreement and the capabilities of the mobile communication device 116 and/or the network connection. If the content requires payment, then the trusted content source 175 can request authorization of payment. In one embodiment, the billing and fulfillment engine 245 can verify authorization by the user for billing the requested content by charging the subscription account or by charging against a form of payment that is on file.

In one or more embodiments, the billing and fulfillment engine can link from the interactive site 225 to a third party site for order fulfillment. For example, the user can select a certain goods item from the set of offerings at the interactive site 225. To fulfill this order, the billing and fulfillment engine 245 can open a new site window that allows a third party to accept the order details and/or payment.

In one or more embodiments, after the billing and fulfillment engine 245 had completed arrangements for delivery and (if applicable) payment for the selected item, the item can be sent to the user. A content or application item can be sent directly to the mobile communication device 116 for consumption. For example, a media content item can begin streaming for reproduction at a media player application of the mobile communication device 116. In another example, an application can begin loading at the mobile communication device. If the item is a good or service, then the billing and fulfillment engine 245 can send a notification to the mobile communication device 116 describing the good or service that will be delivered or performed. In one or more embodiments, when a content or application item is delivered to the mobile communication device 116 or when a good or service is delivered or performed for the user, a means will be included at the mobile communication device 116 for capturing user feedback. A feedback and metrics engine 255 can capture user opinions regarding their experience with the delivered item. In one embodiment, the feedback data can be in the form of attributes describing the delivered item or attributes describing the user's experience.

In one or more embodiments, the relevancy engine 205 can incorporate the feedback information into the user persona. For example, the relevancy engine 205 can correlate the self-described attributes of the user with attributes of the delivered item (content, application, good, and/or service) to further build predictive correlations between the user's self-perceived personality and preferences and their reactive preferences. In one or more embodiments, the relevancy engine 205 can use the feedback information, as incorporated into the user persona, to tailor subsequent sets of offerings that can be presented to the user at the interactive site 225.

Figure 3A:
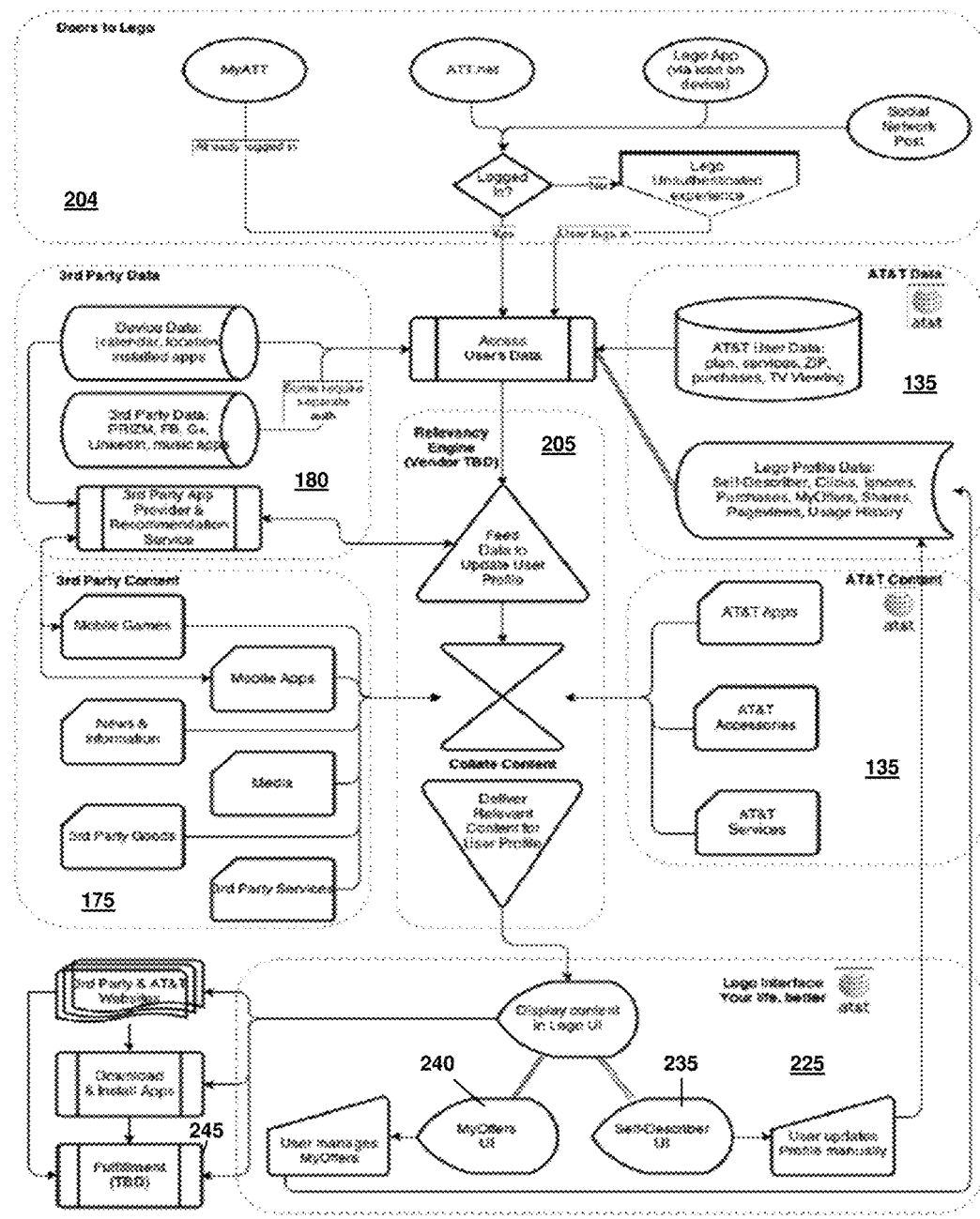
FIG. 3A depicts illustrative embodiments of a block diagram for providing relevant content and services to an authenticated user of a mobile device in a communication network.
Figure 3B:
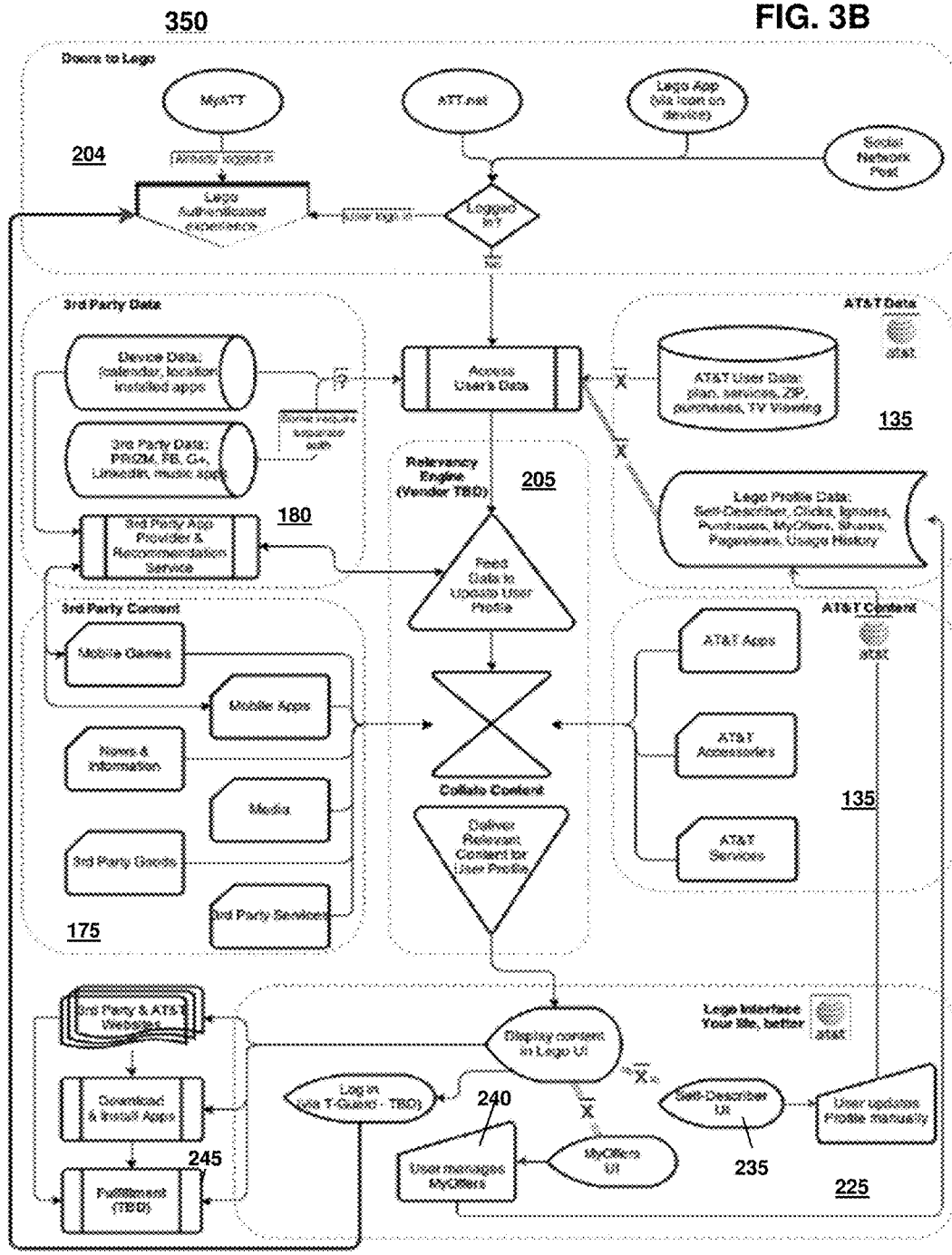
FIG. 3B depicts illustrative embodiments of a block diagram for providing relevant content and services to an unauthenticated user of a mobile device in a communication network.

In FIG. 3A, illustrative embodiments are presented of a block diagram of the engagement system 300 for providing relevant content and services to an authenticated user. In one or more embodiments, the engagement system 300 can determine, when the user attempts to enter the interactive site from a doorway application, the engagement system 300 determines whether the mobile communication device 116 is already logged into a subscription management site, such as myATT.net™. If the mobile communication device 116 is not logged in, then the user must be authenticated for the access to the subscription management site before the mobile device is transferred to the interactive site (assuming that the interactive site is combined with the subscription management site). In FIG. 3B, illustrative embodiments are presented of a block diagram for providing relevant content and services to an unauthenticated user. In one or more embodiments, if the user that is attempting to enter the interactive site from the doorway site is already logged into the subscription management site, then the mobile communication device 116 is immediately transferred to the interactive site without further authentication.

Figure 4:
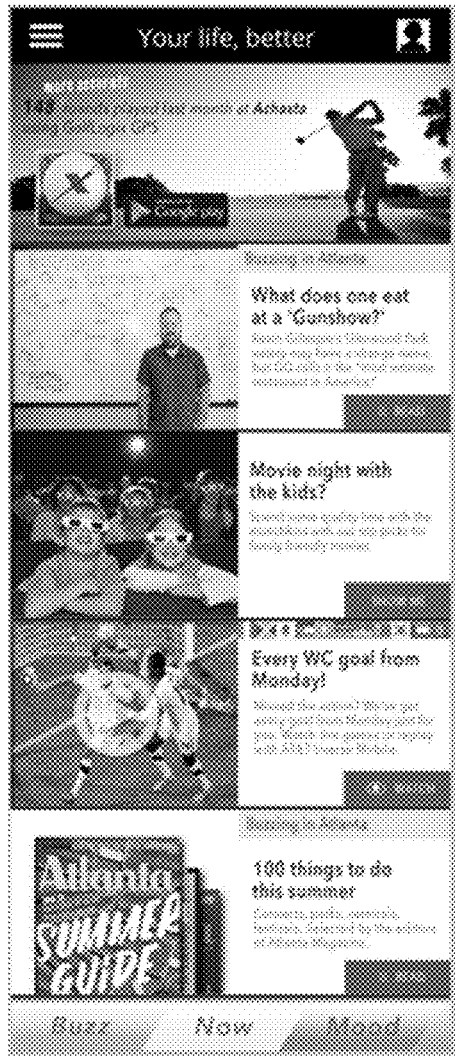
FIG. 4 depicts illustrative embodiments of interactive sites for providing relevant content or services to a user of a mobile device.
Figure 4:

FIG. 4 depicts illustrative embodiments of interactive sites for providing relevant content or services to a user of a mobile communication device 116. In one or more embodiments, the relevancy engine 205 can generated different versions of the interactive site 400 depending upon the location of the mobile communication device 116. The relevancy engine 205 can determine the present location of the mobile communication device 116 from a self-reporting by the device or by information from the network path to the device. If, for example, a mobile communication device 116 is found to be located in Atlanta at a first time and in Seattle at a second time, the relevancy engine 205 can determine that the interactive site should be different for this same mobile communication device 116 (and same user) just based on the difference in location. In an attempt to provide relevant offerings, the relevancy engine can, for example, replace informational content choices for restaurants. In another example, the relevancy engine 205 can know that Atlanta is where the user lives, while Seattle is where the user is visiting. So, the relevancy engine includes a content offering associated with how to entertain children in the Atlanta version but replaces this offering with an adult alternative music selection for the Seattle version. Similarly, the Atlanta version can present an offer for a local golf course, while the Seattle version replaces this offering with one directed to ground transportation in the Seattle area.

Figure 5A:
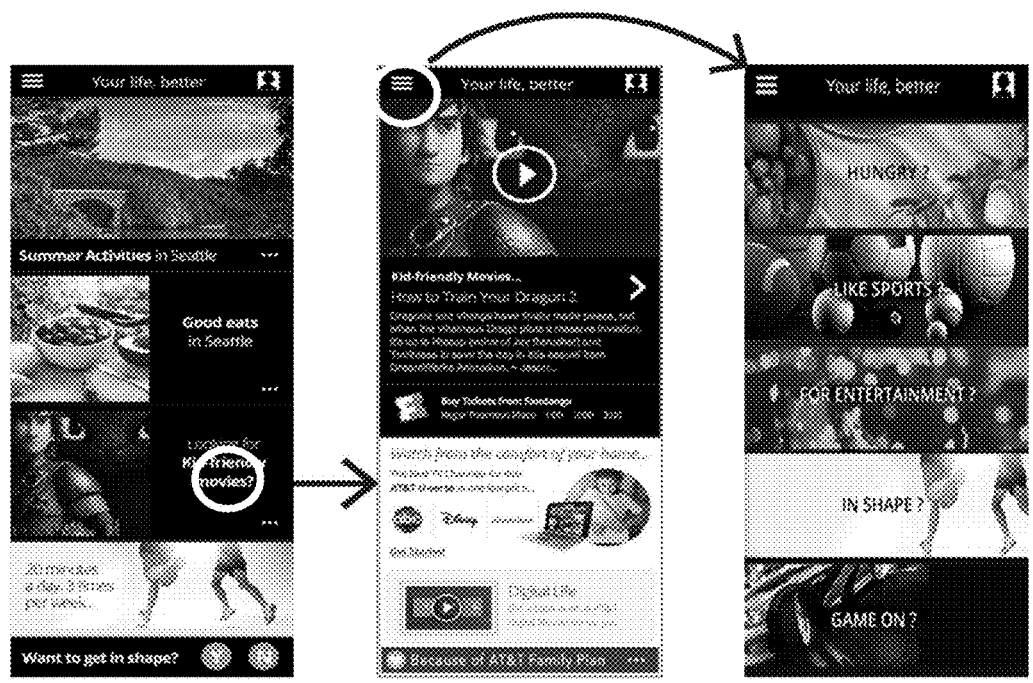
FIGS. 5A, and 5B depict illustrative embodiments for providing relevant content or services to a mobile device user via an interactive site.
Figure 5B:

FIGS. 5A and 5B depict illustrative embodiments for providing relevant content or services to a mobile communication device 116 user via an interactive site 500. In one or more embodiments, the interactive site provides a hierarchical and rich set of offering choices that is tailored to how the user interacts with the site. For example, the offerings can begin with an interest-level offer of "Locations for Kid-friendly movies." The relevancy engine 205 can select an exemplary movie to display with this interest-level offering based on the user persona. The user can be attracted by the exemplary content and/or the offer of a location to access such content. Either way, if the user selects the offering, then the interactive site 500 can present more information about the particular content item that attracted the user's eye and about a location for watching this movie, in this case a local movie theatre, where the user can immediately click on an E-ticket offer. At the same time, the relevancy engine 205 can react to the user's apparent interest in a particular kid-friendly movie and a place to see such movies by presenting yet another offer. In this case the offer is an advertisement for services from the telecommunications service provider, where those services include digital channels for consuming kid-friendly content. This offer can also include a means to access more information and/or to order services.

In another embodiment, the interactive site 500 provides an easy way for the user to review a list of offering gateways. If the user clicks on the offering icon in the upper left corner, then he/she is shown a list of quick questions that attempt to illicit gut-level responses from the user. Each of these questions can lead to further questions and/or further offerings. As the user reveals information regarding to his/her present physical or mental state, preferences, interests, and attributes, the relevancy engine learns more about the user and can continuously refine and update offerings to hone in on offerings that are very relevant to the user at the present time.

In one or more embodiments, the interactive site 500 provides an easy way for the user to provide self-describing attribute information. If the user clicks the self-description icon in the upper right corner, then he/she is shown one or more attributes that describe the user. The user can agree or disagree. For example, the user can decide if he/she "likes" this description. The results of the attribute query can be included in the user persona. The relevancy engine 205 can use the attribute information to refine the user persona and to update offerings. In one embodiment, a new set of offerings can be generated and presented based on the latest self-description. For example, if the user agrees with an attribute assessment positing that he/she is a reader 70% of the time, a watcher 20% of the time, and a listener 10% of the time, then the relevancy engine 205 can, accordingly, generate offerings weighted toward reading content while including viewable and listenable content.

Figure 6:
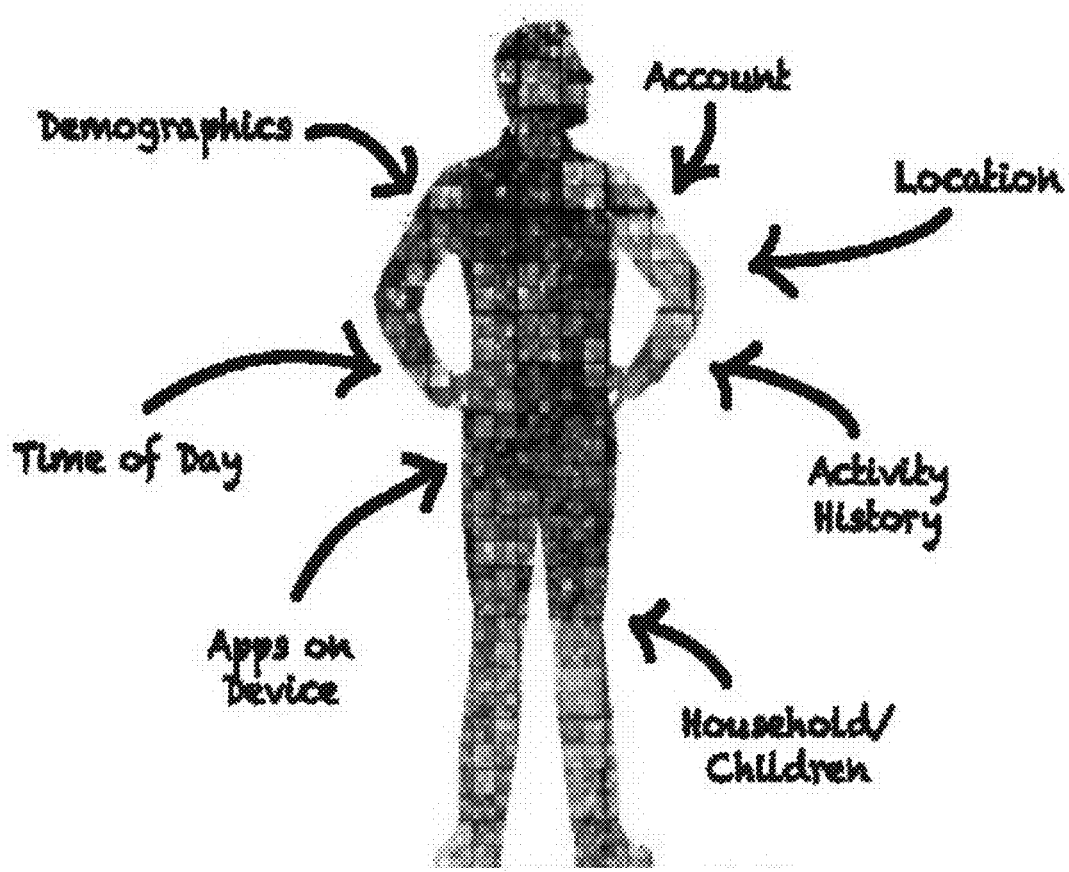
FIG. 6 depicts illustrative embodiments of a graphical representation of a user persona for a user of a mobile device.

In FIG. 6, illustrative embodiments are depicted of a graphical representation of a user persona for a user of a mobile device. In one or more embodiments, a user persona 600 can be depicted graphically. For example, a user persona can be presentable as a graphical person that is made up of the content items that the user has consumed. Each content block of the graphical persona can contain a graphical representation of a content item, such as a screen grab or a promotional picture associated with the content item. The content blocks can be arranged in anthropomorphic order, where intellectual items, such as news articles, are placed in the region of the head, while more emotional items are placed near the heart. The content blocks can be arranged to signify general categories of content. For example, all of the user's favorite television shows could be group on his right leg. The most favorite shows can be placed at the top of the leg, while lessor shows can be placed at the right foot. Alternatively, the most recently watched shows can be placed near the foot, while those watched in past years are placed at the knee. The user persona 600 can be made up of self-reported information, demographics, information from the user's account, viewing location and time information, information regarding applications loaded on the mobile communication device, household information, and activity history.

In one or more embodiments, the graphical user persona can be presented to the user at the interactive site as a visual representation of a digital persona of the user. In one embodiment, the user can select the blocks that make up the user persona and, when select, information is presented to the user regarding the content, when it was consumed, and/or the user's reaction. The blocks can represent content, applications, goods, and/or services that the user has selected from the offerings at the interactive site. In one embodiment, the user can further select blocks to cause a previously consumed item to be made available again. For example, a block can be a link to a book that the user has previously selected from the offerings. If the user wants to reread (of finish reading) the electronic version of the book, then the user can click on the persona block for this book and it will be delivered to the mobile communication device 116 for consumption. In one or more embodiments, the user persona information can be in a standard, fungible format. The user persona can be transferred to the user or to a third party for us in a variety of ways, including determining advertising relevant to the user.

Figure 7:
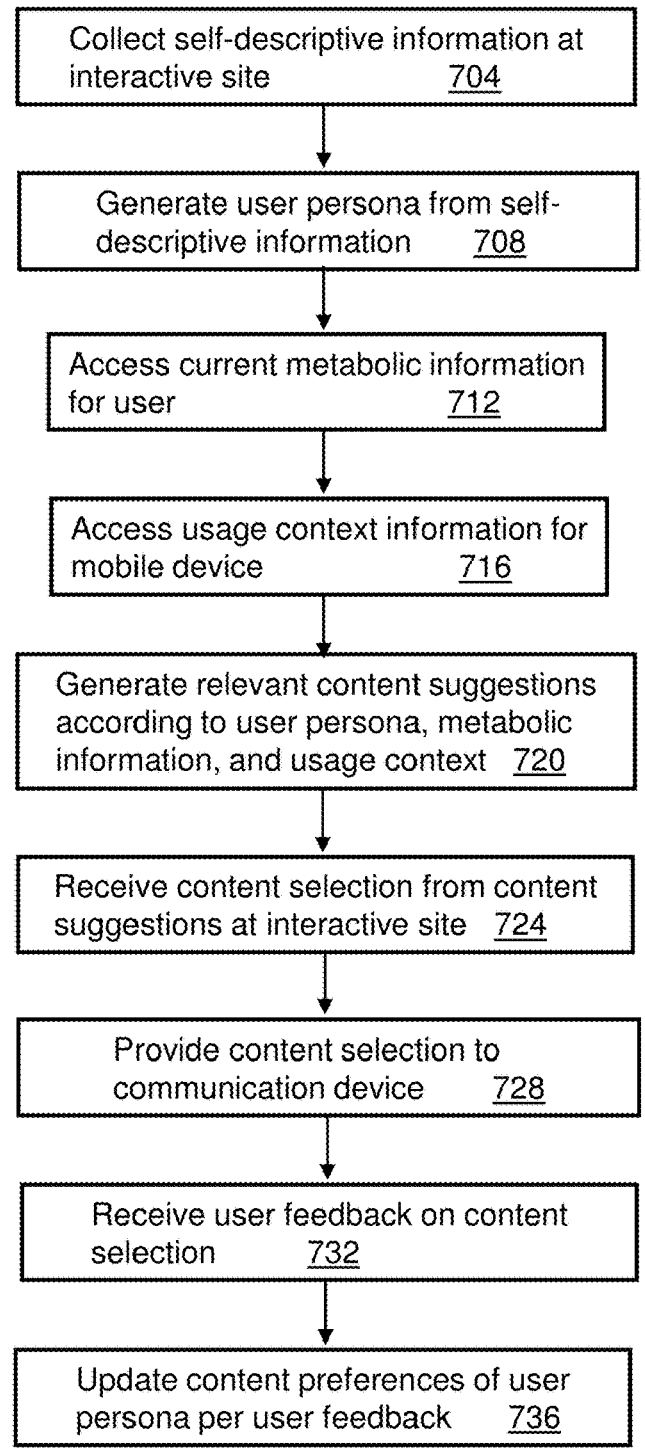
FIG. 7 depicts illustrative embodiments of a method used in portions of the system described in FIGS. 1, 2, 3A, and 3B.

FIG. 7 depicts an illustrative embodiment of a method 700 for providing relevant offerings to a user of a mobile communication device via an interactive site. In one or more embodiments, at step 704, a relevancy engine can collect self-descriptive information associated with the user at the interactive site. At step 708, the relevancy engine can generate a user persona for the user according to the self-descriptive information. At step 712, the relevancy engine can access metabolic information associated with the user and/or the user's proximity. At step 716, the relevancy engine can access usage context information associated with the mobile communication device, such as location, network connection, and available capabilities.

At step 720, the relevancy engine can generate a set of relevant content suggestions for the mobile communication device. At step 724, the relevancy engine can receive a content selection from the mobile communication device and, in turn, provide the content selection to the mobile communication device at step 728. At step 732, the relevancy engine can receive user feedback from the mobile communication device regarding the delivered content. At step 736, the relevancy engine can update the user persona according to the content preferences.

Figure 8:
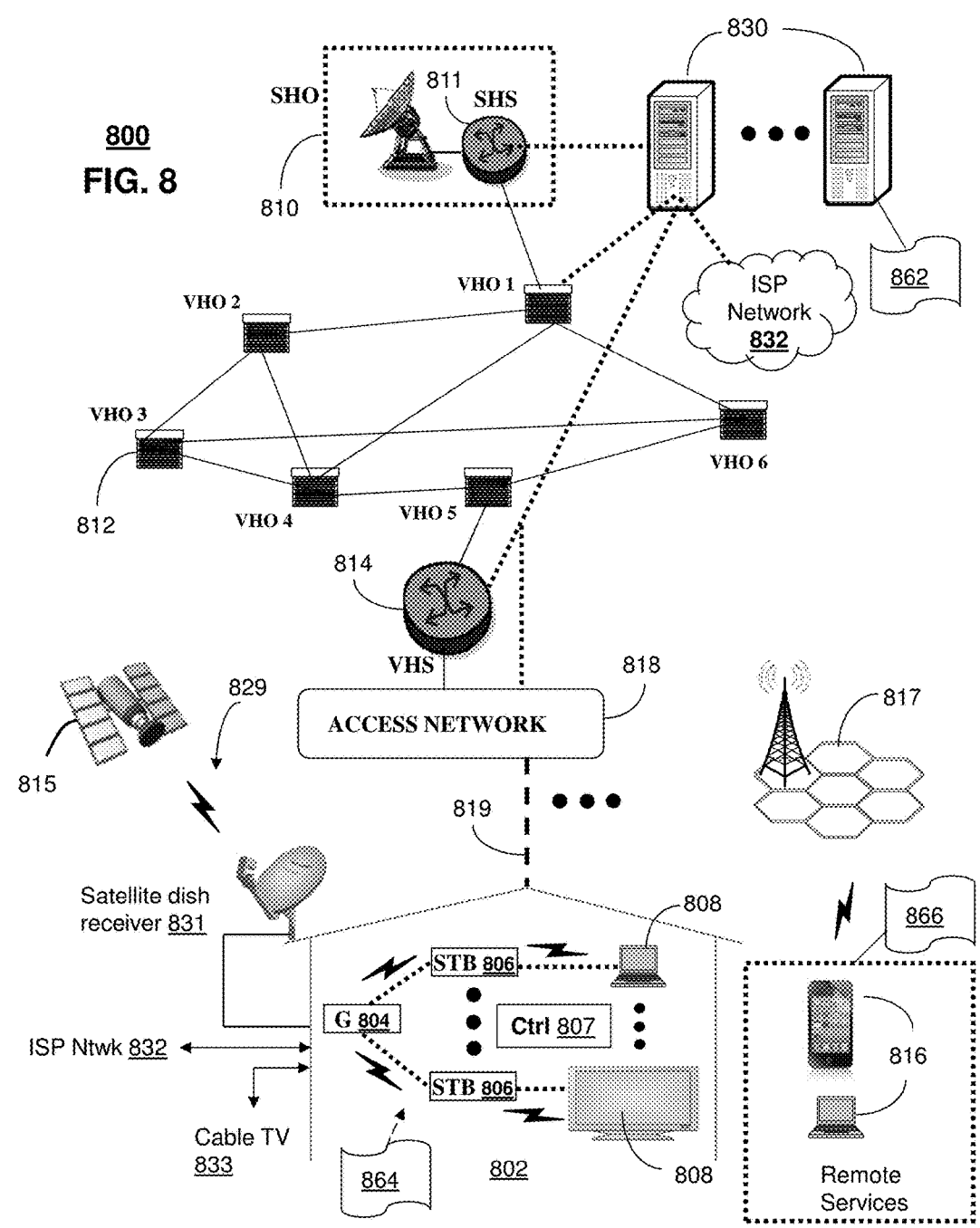
FIGS. 8-9 depict illustrative embodiments of communication systems that provide communication and media services for communication devices according to embodiments illustrated in FIGS. 1, 2, 3A, and 3B.

FIG. 8 depicts an illustrative embodiment of a first communication system 400 for delivering media content. The communication system 800 can represent an Internet Protocol Television (IPTV) media system. Communication system 400 can be overlaid or operably coupled with systems 100-200 of FIGS. 1 and 2 as another representative embodiment of communication system 800. Communication system 800 can be used with a method 700 for providing relevant content selections for a mobile communication device 116 according to information at a telecommunication system 100. For instance, one or more devices illustrated in the communication system 800 of FIG. 8 can be used as a mobile communication device 116, or as engagement server 130.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a communications server 830 herein referred to as server 830. The server 830 can use computing and communication technology to perform function 862 which can include among other things, providing communication connectivity between UE devices 110 and 125 in a telecommunication server that is described by method 300 of FIG. 3. For instance, function 862 of server 830 can be similar to the functions described for engagement server 130 of FIGS. 1-2 in accordance with method 700 of FIG. 7. The media processors 806 and wireless communication devices 816 can be provisioned with software functions 864 and 866, respectively, to utilize the services of server 830.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
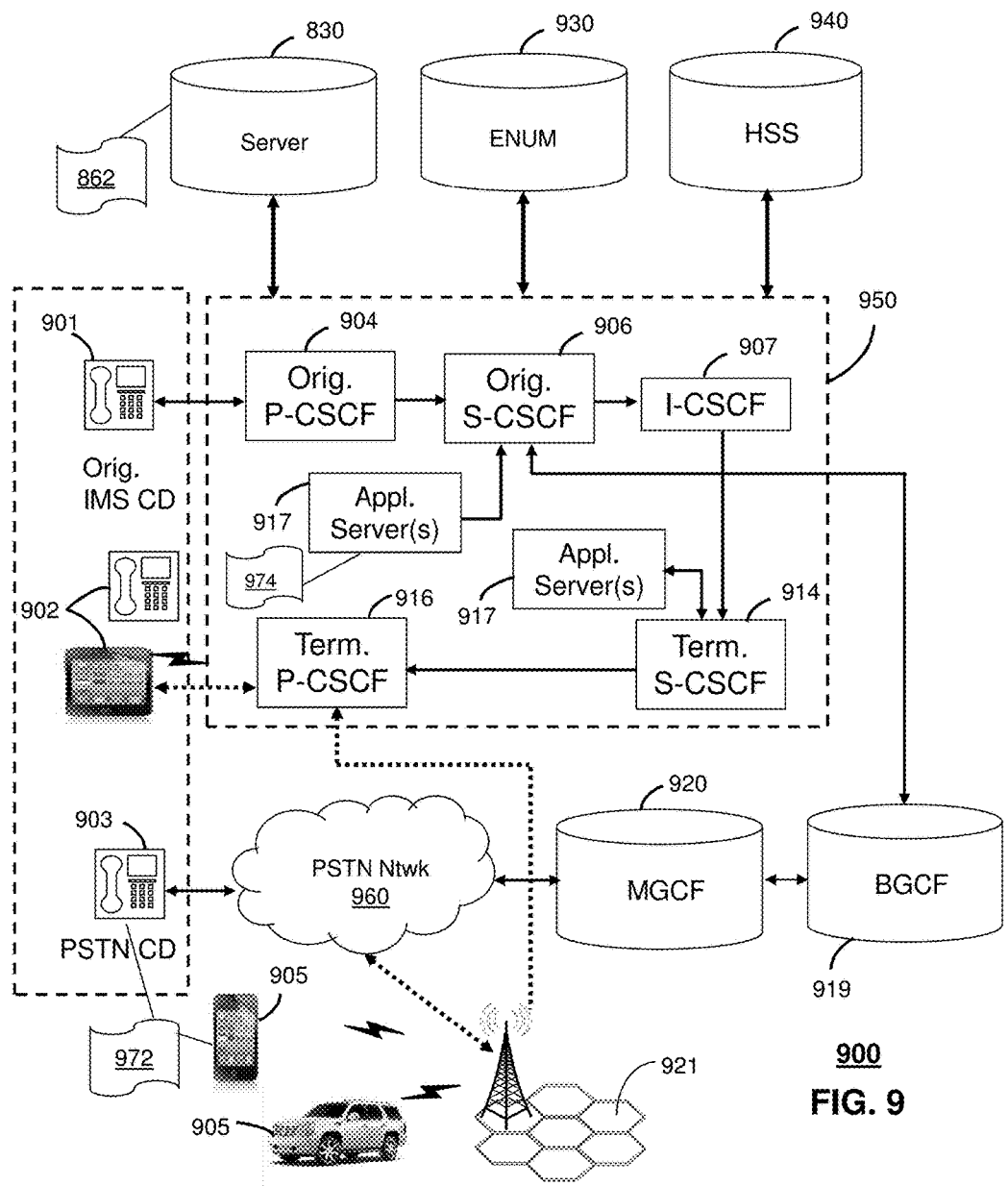

FIG. 9 depicts an illustrative embodiment of a communication system 900 employing an IP Multimedia Subsystem (IMS) network architecture to facilitate the combined services of circuit-switched and packet-switched systems. Communication system 900 can be overlaid and/or operably coupled with systems 100-200 of FIGS. 1-2 and/or communication system 800 of FIG. 8 as another representative embodiment of communication systems 100, 200, and/or 800. Communication system 900 can be used with a method 700 for providing relevant content offerings for mobile communication devices 116. Devices depicted in FIG. 9 can be used as engagement servers 130 and/or mobile communication devices 116.

Communication system 900 can comprise a Home Subscriber Server (HSS) 940, a tElephone NUmber Mapping (ENUM) server 930, and other network elements of an IMS network 950. The IMS network 950 can establish communications between IMS-compliant communication devices (CDs) 901, 902, Public Switched Telephone Network (PSTN) CDs 903, 905, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the ENUM system 930 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 800 of FIG. 8.

If the terminating communication device is instead a PSTN CD such as CD 903 or CD 905 (in instances where the cellular phone only supports circuit-switched voice communications), the ENUM system 930 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications.

It is further appreciated that the CDs of FIG. 9 can operate as wireline or wireless devices. For example, the CDs of FIG. 9 can be communicatively coupled to a cellular base station 921, a femtocell, a WiFi router, a Digital Enhanced Cordless Telecommunications (DECT) base unit, or another suitable wireless access unit to establish communications with the IMS network 950 of FIG. 9. The cellular access base station 921 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 921 may communicate directly with the IMS network 950 as shown by the arrow connecting the cellular base station 921 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 830 of FIG. 8 can be operably coupled to communication system 900 for purposes similar to those described above. Server 830 can perform function 862 and thereby provide wireless communications services to the CDs 901, 902, 903 and 905 of FIG. 9 similar to the functions described for server 830 of FIG. 8 in accordance with method 700 of FIG. 7. CDs 901, 902, 903 and 905, which can be adapted with software to perform function 972 to utilize the services of the server 830 similar to the functions described for communication devices 816 of FIG. 8 in accordance with method 700 of FIG. 7. Server 830 can be an integral part of the application server(s) 917 performing function 974, which can be substantially similar to function 862 and adapted to the operations of the IMS network 950.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

In one or more embodiments, a user/subscriber to a service of the communication system 900 can opt in to comprehensive services and/or the use of data collected from the comprehensive services in the generation of relevant content suggestions. For example, a user/subscriber can subscribe to mobile telecommunication services (voice/data) for a mobile communication device 905 while further subscribing to telecommunication services for landline telephones and/or internet, cable, and/or satellite television service. In one or more embodiments, the user can access telecommunication services via a connected vehicle environment 906, a connected home environment, and/or a connected appliance (refrigerator, stove). In one embodiment, metabolic sensing devices, such as wearable devices, can be integrated into the communication system 900.

In one embodiment, the engagement server 830 can access additionally available information, such as landline or mobile calling records, content watched at a television service, content consumed at a connected vehicle 906, home-environment, and/or home appliances. The engagement server 830 can use these additional information sources to generate sets of relevant content for the user for any devices that the user/subscriber has connected to the communication system 900. For example, the user persona information for the user/subscriber can be shared between a mobile communication device 905 and an internet-connected refrigerator belonging to the user/subscriber. In one embodiment, a variation of the engagement server 830 can generated a set of suggested content based on the current contents of the refrigerator or can generate a suggested meal to enjoy with the suggested content based on the combination of information available to the engagement server 830 across the communication system 900.

Figure 10:
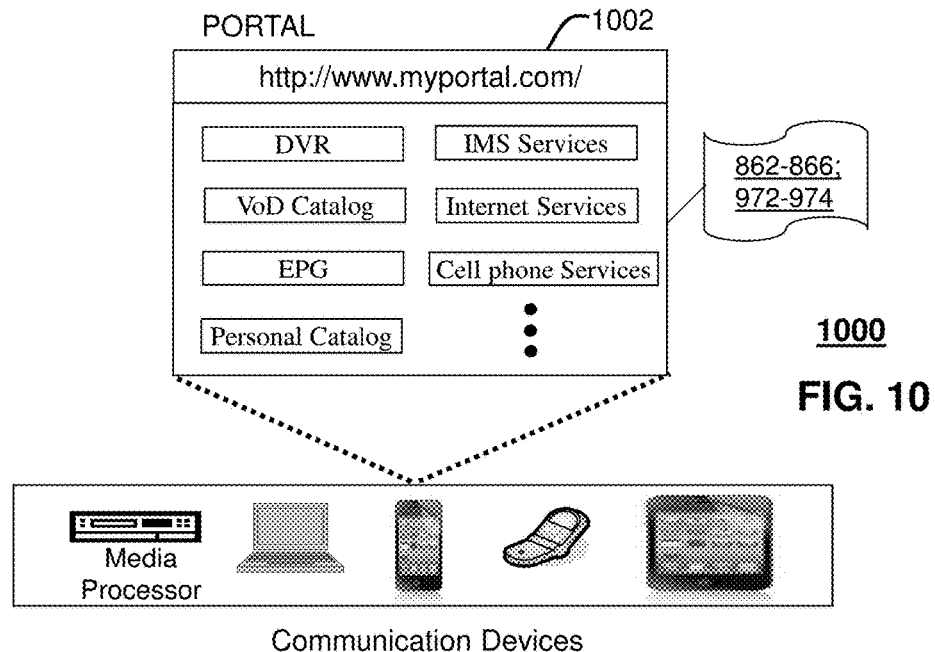
FIG. 10 depicts an illustrative embodiment of a web portal for interacting with the communication systems of FIGS. 1, 2, 3A, and 3B and 8-9.

FIG. 10 depicts an illustrative embodiment of a web portal 1002 of a communication system 1000. Communication system 1000 can be overlaid or operably coupled with systems 100-200 of FIGS. 1-2, communication system 800, and/or communication system 900 as another representative embodiment of systems 100-200 of FIGS. 1-2, communication system 800, and/or communication system 900. The web portal 1002 can be used for managing services of systems 100-200 of FIGS. 1-2 and communication systems 800-900. A web page of the web portal 1002 can be accessed by a Uniform Resource Locator (URL) with an Internet browser using an Internet-capable communication device such as those described in FIGS. 1-2 and FIGS. 8-9. The web portal 1002 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 1002 can also be used for provisioning IMS services described earlier, provisioning Internet services, provisioning cellular phone services, and so on.

The web portal 1002 can further be utilized to manage and provision software applications 862-866, and 972-974 to adapt these applications as may be desired by subscribers and/or service providers of systems 100-200 of FIGS. 1-2, and communication systems 800-900. For instance, users of the services provided by server 830 can log into their on-line accounts and provision the server 830 with a user or machine profile or an identifier associated with mobile communication device 116, to enable the server 830 to perform operations using devices described in FIGS. 1, 2, 8, and 9. Service providers can log onto an administrator account to provision, monitor and/or maintain the user or machine profile or the identifier of systems 100-200 of FIGS. 1-2 and/or systems 800 and 900 of FIGS. 8-9.

Figure 11:
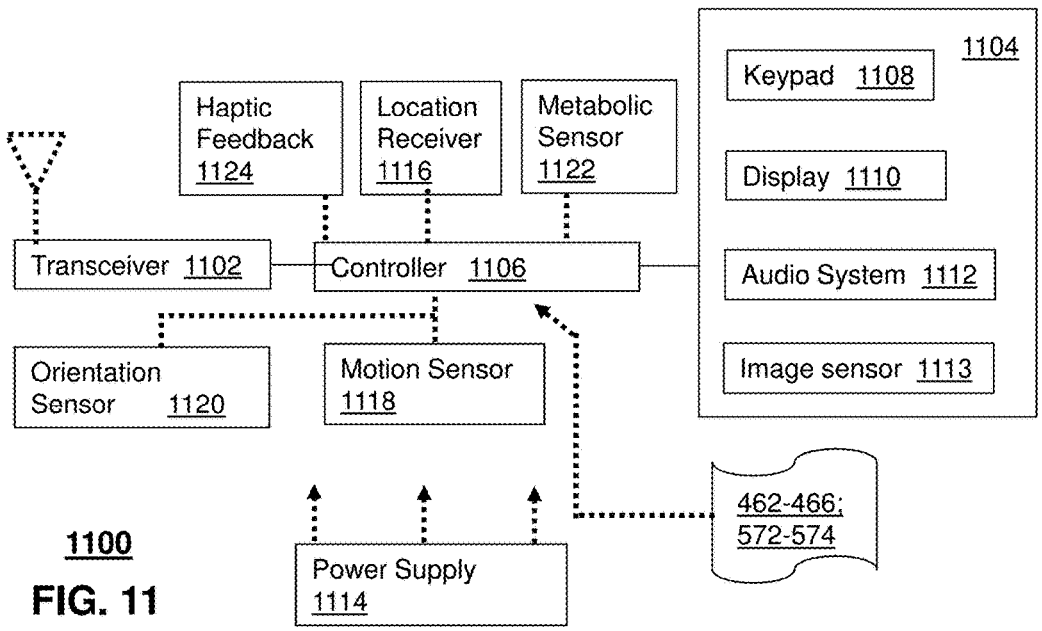
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1, 2, and 8-9. Communication device 1100 in whole or in part can represent any of the communication devices described in FIGS. 1, 2, and 8-95 and can be configured to perform portions of method 700 of FIG. 7.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features. In an embodiment, one or more metabolic sensors 1122 can be integrated into the communication device 1100 to provide metabolic information to the engagement server 830 via a communication system 800.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

The communication device 1100 can include haptic feedback technology 1124. The haptic feedback technology 1124 can provide a means for physically interacting with and/or directing the user of the communication device 1100. For example, the engagement server 830 can generated suggestions for content that is relevant to the user, where a location that is associated with the relevant content is important. For example, the relevant content could be a restaurant. The haptic feedback feature 1124 can be used to lead the user to the movie theatre to watch the movie. In one or more embodiments, the communication device 1100 can include a motion sensor 1118 that can determine that the user is on foot and a GPS component that can determine that the user is in an urban environment. When the user selects the suggested restaurant at the interact site, the fulfillment function of the engagement server 830 can transmit the location of the restaurant to the communication device 1100. The communication device 1100 can indicate the location and provide directions for the restaurant via a display 1110. In addition, the haptic feedback function 1124 can provide physical feedback to the user via, for example vibrations concentrated on the left side or the right side of the communication device 1100, in order to communicate which direction the user should turn as he/she navigates to the restaurant. In one embodiment, the haptic feedback function 1124 can be integrated into a wearable communication device 1100. In one embodiment, the haptic feedback 1124 can include vibrations that vary in frequency, duration, location, and/or intensity to indicate additional information to the user, such as whether the user is close to the destination.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of devices of FIGS. 1, 2, 8, and 9, and can be used with a method 300 for providing relevant content offerings for mobile communication devices 116. For instance, the communication device 1100 of FIG. 1 can be used as a mobile communication device 116 and/or an engagement server 130. The communication device 1100 of FIG. 11 can be the media processor 806, the media devices 808, or the portable communication devices 816 of FIG. 8, as well as the IMS CDs 901-902 and PSTN CDs 903-905 of FIG. 9. It will be appreciated that the communication device 1100 can also represent other devices that can operate in systems 100-200 of FIGS. 1-2, as well as communication systems 800-900 of FIGS. 8-9. In addition, the controller 1106 can be adapted in various embodiments to perform the functions 862-864 and 972-976, respectively.

Figure 12:
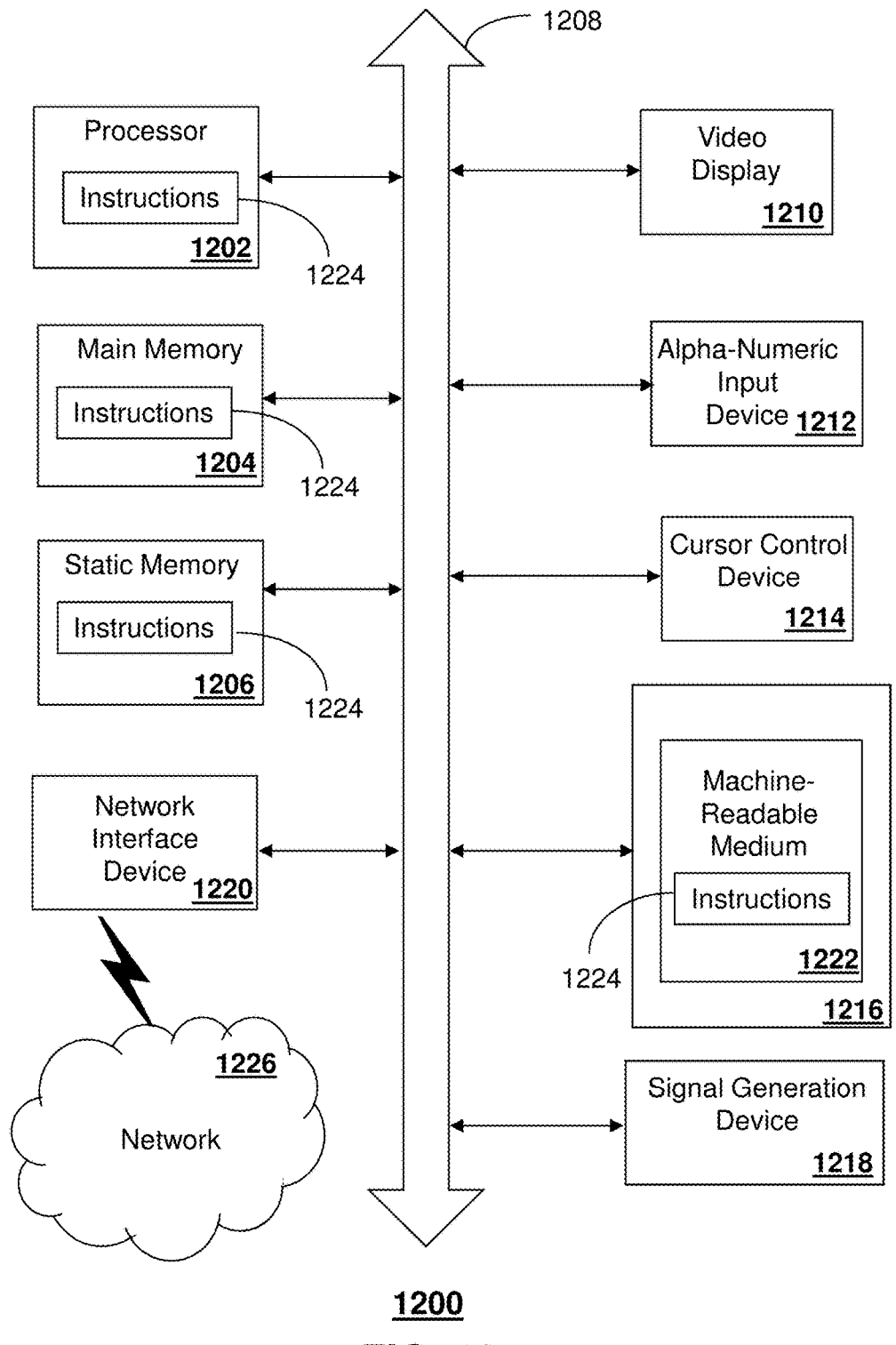
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the engagement server 130 and/or the mobile communication device 116. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage device comprising executable instructions which, responsive to being executed by a processing system including a processor, facilitate performance of operations, the operations comprising:
generating a user persona comprising a plurality of attributes and a plurality of content preferences of a user of a communication device of a communication network;
receiving wireless signals from a metabolic sensor proximate to the user, wherein the metabolic sensor is incorporated into one of a vehicle, a facility, a furniture item or any combination thereof;
extracting metabolic information associated with the user from the wireless signals;
receiving satellite signals from a global positioning system;
determining a location of the user according to the satellite signals received at communication device;
determining a device parameter associated with the communication device;
generating mental state information for the user based on the metabolic information, the location, and the device parameter;
accessing, via the communication network, usage context information associated with the communication device;
generating a plurality of content suggestions for the user according to the user persona, the mental state information, and the usage context information;
filtering the plurality of content suggestions, according to a set of attributes previously collected from the user, to generate user-relevant content suggestions;
presenting an interactive site to the communication device, wherein the interactive site includes the user-relevant content suggestions;
receiving a content selection from the user-relevant content suggestions at the interactive site;
providing the content selection for reproduction at the communication device;
receiving a first content preference associated with the reproduction of the content selection at the communication device; and
updating the plurality of content preferences of the user persona according to the first content preference that is received,
wherein the user persona comprises a plurality of content blocks, comprising a plurality of graphical representations of content items consumed,
wherein the plurality of graphical representations of the content items consumed collectively define a graphical depiction of a person,
wherein the plurality of content blocks are arranged in anthropomorphic order, and
wherein the anthropomorphic order is based on associations between the plurality of content blocks and anatomical locations of the graphical depiction of the person.

2. The non-transitory, machine-readable storage device of claim 1, wherein the operations further comprise:
collecting self-descriptive information from the user of the communication device via the interactive site; and
updating the user persona according to the self-descriptive information.

3. The non-transitory, machine-readable storage device of claim 1, wherein the operations further comprise:
receiving a second content selection from the plurality of content blocks at the graphical depiction of the user persona; and
providing information regarding the second content selection for consumption at the communication device.

4. The non-transitory, machine-readable storage device of claim 3, wherein news-related items of the plurality of content blocks are placed at anatomical locations in a region of a head the graphical depiction of the person, and wherein emotional items of the plurality of content blocks are placed at anatomical locations in a region of a heart of the graphical depiction of the person.

5. The non-transitory, machine-readable storage device of claim 3, wherein the information regarding the second content selection comprises one of when content of the second content selection was consumed, a reaction of the user to consumption of the content, or both.

6. The non-transitory, machine-readable storage device of claim 1, wherein the plurality of content suggestions comprises a video recommendation for a product, service, or any combination thereof.

7. The non-transitory, machine-readable storage device of claim 1, wherein the usage context information comprises a network capability associated with a communication path between the communication network and the communication device.

8. The non-transitory, machine-readable storage device of claim 1, wherein the device parameter comprises movement information, speed information, or any combination thereof, associated with the communication device.

9. The non-transitory, machine-readable storage device of claim 1, wherein the operations further comprise:
presenting, at the interactive site, subscription information associated with a telecommunication service available at the communication device;
receiving a selection at the interactive site; and
updating a subscription feature for the telecommunication service according to the selection.

10. The non-transitory, machine-readable storage device of claim 9, wherein the subscription information is presented at the interactive site according to an authentication of the communication device by the telecommunication service via the communication network.

11. The non-transitory, machine-readable storage device of claim 9, wherein the operations further comprise:
receiving, at the interactive site, authentication information for the communication device; and
authenticating the communication device for the telecommunication service according to the authentication information.

12. The non-transitory, machine-readable storage device of claim 1, wherein the operations further comprise:
accessing, via the communication network, second usage context information indicating a change of location associated with the communication device; and
updating the plurality of content suggestions at the interactive site according to the change of location.

13. The non-transitory, machine-readable storage device of claim 1, wherein the operations further comprise accessing, via the communication network, loyalty program information associated with the user of the communication device, wherein the plurality of content suggestions are further filtered according to the loyalty program information to generate the user-relevant content suggestions.

14. The non-transitory, machine-readable storage device of claim 1, wherein the operations further comprise:
grading a degree of relevancy for a content item of the user-relevant content suggestions; and
sending a notification to the communication device according to the degree of relevancy exceeding a threshold.

15. A method, comprising:
receiving, by a processing system including a processor, wireless signals from a metabolic sensor proximate to a user of a communication device, wherein the metabolic sensor is incorporated into one of a vehicle, a facility, a furniture item or any combination thereof;
extracting, by the processing system, metabolic information associated with the user of the communication device from the wireless signals;
receiving, by the processing system, satellite signals from a global positioning system;
determining, by the processing system, a location of the user according to satellite signals received at the communication device;
generating, by the processing system, mental state information for the user according to the metabolic information and the location;
accessing, by the processing system, usage context information associated with the communication device;
accessing, by the processing system, user persona information comprising a plurality of attributes associated with the user of the communication device;
generating, by the processing system, content suggestions relevant to the user according to the mental state information, the usage context information, and the user persona information;
filtering, by the processing system, the content suggestions, according to a set of attributes previously collected from the user, to generate user-relevant content suggestions; and
presenting, by the processing system, the user-relevant content suggestions at an interactive site,
wherein the user persona comprises a plurality of content blocks, comprising a plurality of graphical representations of content items consumed,
wherein the plurality of graphical representations of the content items consumed collectively define a graphical depiction of a person,
wherein the plurality of content blocks are arranged in anthropomorphic order, and
wherein the anthropomorphic order is based on associations between the plurality of content blocks and anatomical locations of the graphical depiction of the person.

16. The method of claim 15, further comprising:
capturing at the interactive site, by the processing system, an attribute of the user of the communication device; and
updating, by the processing system, the plurality of attributes of the user personal information according to the attribute that is captured.

17. The method of claim 15, further comprising:
receiving, by the processing system, a content selection from the user-relevant content suggestions presented at the interactive site; and
updating, by the processing system, a plurality of content preferences of the user persona according to a content preference that is received.

18. The method of claim 15, wherein the metabolic information comprises a summary including one of a presumed physical state of the user, a presumed mental state of the user or both.

19. A device comprising:
a memory to store executable instructions; and
a processing system including a processor communicatively coupled to the memory, wherein the executable instructions, responsive to being executed by the processing system, facilitates performance of operations, the operations comprising:
accessing a user persona comprising a plurality of attributes and a plurality of content preferences of a user of a communication device;
receiving wireless signals from a metabolic sensor proximate to the user, wherein the metabolic sensor is incorporated into one of a vehicle, a facility, a furniture item or any combination thereof;
extracting metabolic information associated with the user from the wireless signals;

receiving satellite signals from a global positioning system;

determining a location of the user according to the satellite signals receive at the communication device;

generating mental state information for the user according to the metabolic information and the location;

transmitting the mental state information associated with the user to a server;

presenting, at an interactive site, user-relevant content suggestions, wherein a plurality of content suggestions are generated according to the user persona and the mental state information, and wherein the plurality of content suggestions are filtered, according to a set of attributes previously collected from the user, to generate the user-relevant content suggestions;

receiving a content selection from a presentation of the user-relevant content suggestions at the interactive site; and updating the plurality of content preferences of the user persona according to the content selection, wherein the user persona comprises a plurality of content blocks, comprising a plurality of graphical representations of content items consumed, wherein the plurality of graphical representations of the content items consumed collectively define a graphical depiction of a person, wherein the plurality of content blocks are arranged in anthropomorphic order, and wherein the anthropomorphic order is based on associations between the plurality of content blocks and anatomical locations of the graphical depiction of the person.

20. The device of claim 19, wherein the metabolic information comprises a summary of a presumed mental state of the user.

\* \* \* \* \*